US00RE42893E

(19) United States
(12) Reissued Patent
Walker et al.

(10) Patent Number: US RE42,893 E
(45) Date of Reissued Patent: Nov. 1, 2011

(54) METHOD AND APPARATUS FOR VERIFYING SECURE DOCUMENT TIMESTAMPING

(75) Inventors: Jay S. Walker, Ridgefield, CT (US); Bruce Schneier, Minneapolis, MN (US); James A. Jorasch, New York, NY (US); Dean P. Alderucci, Westport, CT (US)

(73) Assignee: Walker Digital, LLC, Stamford, CT (US)

( * ) Notice: This patent is subject to a terminal disclaimer.

(21) Appl. No.: 11/541,520

(22) Filed: Sep. 29, 2006

Related U.S. Patent Documents

Reissue of:
(64) Patent No.: 6,959,387
Issued: Oct. 25, 2005
Appl. No.: 09/907,112
Filed: Jul. 17, 2001

U.S. Applications:
(63) Continuation of application No. 11/293,790, filed on Dec. 2, 2005, now Pat. No. Re. 41,960.

(51) Int. Cl.
*H04L 9/00* (2006.01)
*H04N 1/44* (2006.01)
*G06F 21/00* (2006.01)

(52) U.S. Cl. ..... 713/178; 380/243; 705/51

(58) Field of Classification Search ..... 713/178
See application file for complete search history.

(56) References Cited

U.S. PATENT DOCUMENTS

| | | | | |
|---|---|---|---|---|
| 3,943,336 | A | 3/1976 | Dillard et al. | 235/61.11 |
| 3,990,558 | A | 11/1976 | Ehrat | 194/4 R |
| 4,047,000 | A | 9/1977 | Bryant et al. | 235/151.1 |
| 4,108,364 | A | 8/1978 | Tanaka et al. | 235/419 |
| 4,123,747 | A | 10/1978 | Lancto et al. | 340/149 A |

(Continued)

FOREIGN PATENT DOCUMENTS

EP 0 132 782 2/1985

(Continued)

OTHER PUBLICATIONS

G.J. Simmons, "Verification of Treaty Compliance—Revisited"; Proceedings of the 1983 Symposium on Security and Privacy, Apr. 25-27, 1983 (7 pgs).

(Continued)

*Primary Examiner* — Kaveh Abrishamkar
(74) *Attorney, Agent, or Firm* — Fincham Downs, LLC; Carson C. K. Fincham

(57) ABSTRACT

According to one embodiment of the invention, a method is provided for receiving a timestamp from a caller via a telephone connection; receiving a device identifier from the caller, in which the device identifier identifies a device; determining a cryptographic key based on the device identifier; determining an indication of a time based on the timestamp and the cryptographic key; providing the indication of the time to the caller; determining an account; and charging a fee to the account.

25 Claims, 3 Drawing Sheets

U.S. PATENT DOCUMENTS

| | | | | |
|---|---|---|---|---|
| 4,253,158 | A | 2/1981 | McFiggans | 364/900 |
| 4,376,299 | A | 3/1983 | Rivest | 364/900 |
| 4,423,415 | A | 12/1983 | Goldman | 340/825.34 |
| 4,489,318 | A | 12/1984 | Goldman | 340/825.34 |
| 4,546,352 | A | 10/1985 | Goldman | 340/825.34 |
| 4,568,936 | A | 2/1986 | Goldman | 340/825.34 |
| 4,637,051 | A | 1/1987 | Clark | 382/1 |
| 4,641,346 | A | 2/1987 | Clark et al. | 380/3 |
| 4,641,347 | A | 2/1987 | Clark et al. | 380/3 |
| 4,660,221 | A | 4/1987 | Dlugos | 380/23 |
| 4,663,622 | A | 5/1987 | Goldman | 340/825.34 |
| 4,686,527 | A | 8/1987 | Goldman | 340/825.34 |
| 4,689,477 | A | 8/1987 | Goldman | 235/380 |
| 4,725,718 | A | 2/1988 | Sansone et al. | 235/495 |
| 4,749,873 | A | 6/1988 | Mutoh et al. | |
| 4,786,940 | A | 11/1988 | Daniele | 355/6 |
| 4,807,287 | A | 2/1989 | Tucker et al. | 380/23 |
| 4,831,438 | A | 5/1989 | Bellman, Jr. et al. | 358/108 |
| 4,835,713 | A | 5/1989 | Pastor | 364/519 |
| 4,855,580 | A | 8/1989 | Van Maanen, Jr. | 235/440 |
| 4,860,352 | A | 8/1989 | Laurance et al. | |
| 4,868,877 | A | 9/1989 | Fischer | 380/25 |
| 4,893,338 | A | 1/1990 | Pastor | 380/25 |
| 4,972,480 | A | 11/1990 | Rosen | 380/46 |
| 5,001,752 | A | 3/1991 | Fischer | 380/23 |
| 5,005,200 | A | 4/1991 | Fischer | |
| 5,022,080 | A | 6/1991 | Durst et al. | 380/23 |
| 5,027,395 | A | 6/1991 | Anderson et al. | 380/4 |
| 5,075,862 | A | 12/1991 | Doeberl et al. | 395/117 |
| 5,090,699 | A | 2/1992 | Friedman | 273/126 |
| 5,136,643 | A | 8/1992 | Fischer | 380/23 |
| 5,136,646 | A | 8/1992 | Haber et al. | 380/49 |
| 5,136,647 | A | 8/1992 | Haber et al. | 380/49 |
| 5,142,577 | A | 8/1992 | Pastor | 380/21 |
| 5,146,344 | A | 9/1992 | Bennett et al. | |
| 5,153,837 | A | 10/1992 | Shaffer et al. | 364/464.04 |
| 5,157,726 | A | 10/1992 | Merkle et al. | 380/23 |
| 5,186,498 | A | 2/1993 | Dietrich | |
| 5,189,700 | A | 2/1993 | Blandford | 380/23 |
| 5,347,579 | A | 9/1994 | Blandford | 380/25 |
| 5,367,573 | A | 11/1994 | Quimby | 380/25 |
| 5,375,172 | A | 12/1994 | Chrosny | 380/51 |
| 5,396,558 | A | 3/1995 | Ishiguro et al. | |
| 5,404,161 | A | 4/1995 | Douglass et al. | |
| RE34,954 | E | 5/1995 | Haber et al. | 380/49 |
| 5,414,841 | A | 5/1995 | Bingham et al. | 395/600 |
| 5,444,780 | A | 8/1995 | Hartman, Jr. | 380/51 |
| 5,448,641 | A * | 9/1995 | Pintsov et al. | 380/51 |
| 5,463,547 | A | 10/1995 | Markowitz et al. | 364/408 |
| 5,464,971 | A | 11/1995 | Sutcliffe et al. | 235/379 |
| 5,467,447 | A | 11/1995 | Vogel | 395/145 |
| 5,490,217 | A | 2/1996 | Wang et al. | 380/51 |
| 5,497,149 | A | 3/1996 | Fast | |
| 5,497,419 | A | 3/1996 | Hill | 380/9 |
| 5,499,249 | A | 3/1996 | Agrawal et al. | 371/25.1 |
| 5,499,294 | A | 3/1996 | Friedman | 380/10 |
| 5,500,897 | A | 3/1996 | Hartman, Jr. | 380/25 |
| 5,530,755 | A | 6/1996 | Pailles et al. | 380/18 |
| 5,549,117 | A | 8/1996 | Tacklind et al. | 128/716 |
| 5,564,429 | A | 10/1996 | Bornn et al. | 128/696 |
| 5,574,427 | A | 11/1996 | Cavaliaro | |
| 5,615,268 | A | 3/1997 | Bisbee et al. | 380/25 |
| 5,626,144 | A | 5/1997 | Tacklind et al. | 128/725 |
| 5,629,980 | A | 5/1997 | Stefik et al. | 380/4 |
| 5,638,186 | A | 6/1997 | Motoyama | 358/448 |
| 5,638,443 | A | 6/1997 | Stefik et al. | 380/4 |
| 5,646,994 | A | 7/1997 | Hill | 380/9 |
| 5,649,185 | A | 7/1997 | Antognini et al. | 395/609 |
| 5,659,617 | A | 8/1997 | Fischer | |
| 5,671,285 | A | 9/1997 | Newman | |
| 5,704,366 | A | 1/1998 | Tacklind et al. | 128/716 |
| 5,715,403 | A | 2/1998 | Stefik | 395/244 |
| 5,748,738 | A | 5/1998 | Bisbee et al. | 380/25 |
| 5,761,309 | A | 6/1998 | Ohashi et al. | 380/25 |
| 5,768,382 | A | 6/1998 | Schneier et al. | |
| 5,781,629 | A | 7/1998 | Haber et al. | 380/23 |
| 5,784,610 | A | 7/1998 | Copeland, III et al. | 395/615 |
| 5,828,751 | A | 10/1998 | Walker et al. | 380/25 |
| 5,831,859 | A | 11/1998 | Medeiros et al. | 364/478.06 |
| 5,848,426 | A | 12/1998 | Wang et al. | 707/505 |
| 5,899,998 | A | 5/1999 | McGauley et al. | 707/104 |
| 5,913,197 | A | 6/1999 | Kameda | 705/3 |
| 5,923,018 | A | 7/1999 | Kameda | 235/385 |
| 5,923,763 | A | 7/1999 | Walker et al. | 380/51 |
| 6,182,219 | B1 | 1/2001 | Feldbau et al. | 713/176 |
| 6,188,766 | B1 | 2/2001 | Kocher | 380/246 |
| 6,263,438 | B1 | 7/2001 | Walker et al. | |
| 6,393,566 | B1 | 5/2002 | Levine | |

FOREIGN PATENT DOCUMENTS

| | | | |
|---|---|---|---|
| EP | 0 154 972 | | 9/1985 |
| EP | 0 331 352 | A2 | 9/1989 |
| EP | 0 440 021 | A3 | 8/1991 |
| EP | 0 547 837 | A2 | 6/1993 |
| EP | 0 684 575 | | 12/1994 |
| EP | 0 684 575 | A1 | 12/1994 |
| EP | 0 647 925 | A2 | 4/1995 |
| EP | 0 727 894 | A1 | 8/1996 |
| GB | 2 065 030 | A | 6/1981 |
| JP | 03185551 | A | 8/1991 |

OTHER PUBLICATIONS

"Parallax Security Introduces 'EXROY' the New Concept", PR Newswire, Apr. 28, 1988. (1 pg).

Miller, S.P. et al., "Kerberos Authentication and Authorization System", Project Athena Technical Plan, Oct. 27, 1988. (33 pgs).

Bayer, David et al., "Improving the Efficiency and Reliability of Digital Time-Stamping", Sequence II: Methods in Communication, Security, and Computer Science, eds., Mar. 1992 at pp. 329-334. (6 pgs).

"Bellcore Spins Off New Company to Offer Digital Notary™ (SM) Service", Corporate Communications, Mar. 22, 1994. (2 pgs).

Haber et al., "How do Digital Time-Stamps Support Digital Signatures?", Cryptobytes—The Technical Newsletter of RSA Laboratories, Autumn 1995, pp. 14-15 (2 pgs).

"First Fully Authenticated Digital Video Surveillance System Features Advanced RSA Security Technology", Press Release printed from http://www.rsa.com (RSA Data Security, Inc. World Wide Web site), Oct. 23, 1995. (2 pgs).

Resnik, W.M., "Technology Track, Digital Image Authentication", Aquila Technologies Group, Inc., email: bresnik@aquilagroup com, Jan. 17, 1996. (7 pgs).

"Solana develops 'digital watermark' technology", Miller Freeman PLC, ProSound News Europe, Mar. 1997 at p. 38. (2 pgs).

"Digimarc watermarking technology receives U.S. patent", M2 Presswire, Jun. 16, 1997. (3 pgs).

"Keeping Messages Secret", The McGraw-Hill Companies, Inc., Federal Technology Report, Jul. 17, 1997, Technology Watch section at p. 18. (1 pg).

Herrigel, A. et al., "Optical/digital identification/verification system based on digital watermarking technology", Digital Copyright Technologies, Copyright 2000. (1 pg).

Kay, Russell, "Sharing a Secret: How Kerberos Works", Computerworld, Jul. 3, 2000, Tech—Quickstudy section at p. 52. (2 pgs).

"VeranceCorporation", (www verance com/technology html), download date: Sep. 26, 2000. (2 pgs).

"Patent Overviews", (www surety com/home/patents html), download date: Jul. 25, 2001. (2 pgs).

"Trust in Time", Timestamp.com, (http //www timestamp com/about/index html), download date: Sep. 19, 2001. (5 pgs).

Simmons, Gustavus J., "Contemporary Cryptology—The Science ofInformation Inegrity", The Institute of Electrical and Electronics Engineers, Inc., Copyright 1992, Chapter 13, pp. 615-630. (18 pgs).

Sceneier, Bruce, "Applied Cryptography—Protocols, Algorithms and Source code inC", John Wiley & Sons, Inc., Copyright 1996, pp. 75-79. (8 pgs).

Notice of Allowance for U.S. Appl. No. 09/907,112 mailed Jul. 27, 2007. 4 pp.

Notice of Allowance for U.S. Appl. No. 09/907,112 mailed May 9, 2005, 3 pp.

Notice of Allowance for U.S. Appl. No. 09/907,112 mailed Jul. 27, 2007, 6 pp.
Office Action for U.S. Appl. No. 11/541,522 mailed Sep. 10, 2008, 10 pp.
Office Action for U.S. Appl. No. 11/541,522 mailed Jun. 16, 2008. 7 pp.
Office Action for U.S. Appl. No. 11/870,489 mailed Sep. 3, 2009, 16 pp.
Notice of Allowability for U.S. Appl. No. 08/622,034 mailed Feb. 20, 1998, 4 pp.
Office Action for U.S. Appl. No. 08/622,034 mailed Dec. 22, 1997, 4 pp.
Notice of Allowability for U.S. Appl. No. 09/149,024, mailed Mar. 27, 2001, 1 pg.
Notice of Allowability for U.S. Appl. No. 09/149,024 mailed Dec. 18, 2000, 2 pp.
Notice of Allowance for U.S. Appl. No. 11/293,790 mailed Sep. 9, 2009, 7 pp.
Notice of Allowance for U.S. Appl. No. 11/293,790 mailed Dec. 17, 2008, 10 pp.
Office Action for U.S. Appl. No. 11/293,790 mailed Dec. 19, 2006, 7 pp.
Notice of Allowance for U.S. Appl. No. 11/293,790 mailed Apr. 2, 2010, 6 pp.
Notice of Allowance for U.S. Appl. No. 11/541,522 mailed Nov. 30, 2009, 4 pp.
Office Action for U.S. Appl. No. 11/870,489 mailed Apr. 7, 2010, 26 pp.
Chen and Chen, "The Multisignatures of Time Stamp Techniques with ID-based Cryptosystem", Proceedings of the 10th. International Conference on Information Networking, Jan. 29-31, 1996.

* cited by examiner

METHOD AND APPARATUS FOR VERIFYING SECURE DOCUMENT TIMESTAMPING

Matter enclosed in heavy brackets [ ] appears in the original patent but forms no part of this reissue specification; matter printed in italics indicates the additions made by reissue.

CROSS-REFERENCE TO RELATED APPLICATIONS

[The present application is a continuation-in-part of U.S. patent application Ser. No. 09/149,024, "METHOD AND APPARATUS FOR SECURE DOCUMENT TIMESTAMPING", filed Sep. 8, 1998, which issued as U.S. Pat. No. 6,263,438 on Jul. 17, 2001; which is a continuation of U.S. patent application Ser. No. 08/622,034, filed Mar. 21, 1996, and which issued Jul. 13, 1999 as U.S. Pat. No. 5,923,763. Each of the above related applications is incorporated herein by reference.] *The present application is a continuation of Reissue patent application Ser. No. 11/293,790 filed on Dec. 2, 2005 now U.S. Pat. No. Re. 41,960 for the reissue of U.S. Pat. No. 6,959,387, and more than one continuation application based on Reissue patent application Ser. No. 11/293,790 is being filed. The related continuation applications are application Ser. No. 11/541,520 filed on Sep. 29, 2006 (the present application), application Ser. No. 11/541,522 filed on Sep. 29, 2006, and application Ser. No. 11/870,489 filed on Oct. 11, 2007.*

BACKGROUND OF THE INVENTION

1. Field of the Invention

The present invention relates generally to methods and apparatuses for document timestamping. More particularly, the invention relates to secure and authenticable timestamping of documents in such a way that the timestamp can be verified by a party who was not necessarily present during the timestamping.

2. Background

In many instances where timestamped documents are to be communicated to a temporally or spatially distant recipient, one would like to be able to verify the authenticity and integrity of the timestamp. For example, consider the problem of proving document creation in the course of business transactions. Both the author and the recipient would like to be able to timestamp the document in a manner that demonstrates to others that it was stamped: 1) by the timestamping device (i.e., knowing which device generated the timestamp), and 2) at the indicated time (i.e., that the timestamp has not been modified during or subsequent to timestamping). The first requirement relates to timestamping device authenticability, while the second requirement relates to time integrity. Either or both of these requirements may exist anytime documents are created by one party (or at one location) not under the direct control of the recipient. Common examples include timestamps at the top of fax pages, timestamps at the bottoms of printouts, and postage marks as evidence of mailing. Besides documents, other examples include timeclocks for hourly employees, or for parking garage patrons, for recording the date/time of entry onto the premises.

As indicated by the above examples, many timestamping applications are associated primarily with physical (e.g., paper-based) applications rather than electronic (e.g., digital) applications. This is especially true for document generation where, despite the almost universal use of computer word processing, the majority of documents are still used and stored on paper because of its advantages over electronic media. Such advantages include: 1) ease of document creation (e.g., taking handwritten notes), 2) ease of document retrieval (e.g., without computers or other specialized document readers and no worries about evolving diskette or word processing file formats), 3) long-term stability of paper (e.g., degradation of magnetic media), 4) low cost, and 5) portability. Therefore, a timestamping device for everyday usage should be particularly suitable for use with paper-based documents.

Traditionally, timestamping devices have relied on mechanical inaccessibility, fixed location, and public display to suggest the accuracy of timestamps produced thereby. Many contemporary electronic timestamping devices provide even less assurance than mechanical devices because their timestamping mechanisms are user-accessible, user-resettable, and hidden from public view. Examples include camera date recorders to timestamp pictures, answering machine/voicemail date/time recorders, and computer clocks to timestamp file creation and output such timestamps on document trailers.

Whether mechanical or electronic, each of the above-mentioned examples is prone to resetting of the clock prior to timestamping, or modification of the timestamp after timestamping. For example, the ability to reset the internal date/time is built into almost all personal computer operating systems. Furthermore, the purely electronic devices are especially prone to tampering because of the ease with which a purely electronic document to be timestamped can be accessed and manipulated. Such ease of manipulation has led to the creation of devices which cryptographically certify the authenticity and integrity of electronic documents. Examples of such devices may be seen in several US patents (U.S. Pat. Nos. 5,189,700; 5,157,726; 5,136,647; 5,136,646; 5,022,080; 5,001,752; and 4,786,940) disclosing devices that input digital data, cryptographically certify the digital data, and output a digital message. In addition, certain of these devices optionally add time from a secure internal clock to the digital message.

The aforementioned devices are directed at applications whose primary goal is digital data certification, and any associated timestamping is an adjunct to that goal. In contrast, in many document timestamping applications, the primary goal is time certification rather than data certification. Although the data certification devices can be used for timestamping, such usage would be relatively complicated, expensive, and ill-suited for paper-based timestamping applications because the document data must be digitized. For example, the use of data certification devices with paper documents would require the addition of a document scanner to generate a digital representation of the document for input to the device, leading to increased device cost and complexity.

Furthermore, because data representing the document would be included in the cryptographic message, one wishing to verify the message (e.g., by recomputing the timestamp) would also have to create a digital representation of the message—a costly and possibly infeasible operation for those with limited capabilities. It is often inefficient to timestamp a paper document such that verification of the timestamp requires the timestamp recipient to re-digitize the paper document.

Therefore, there exists a need for a simple, inexpensive, easy-to-use device that generates an accurate and unalterable timestamp, for application to physical media such as paper documents, that can be easily verified by the document recipient.

SUMMARY OF THE INVENTION

According to one embodiment of the invention, a method is provided for receiving a timestamp from a caller via a telephone connection; receiving a device identifier from the caller, in which the device identifier identifies a device; determining a cryptographic key based on the device identifier; determining an indication of a time based on the timestamp and the cryptographic key; providing the indication of the time to the caller; determining an account; and charging a fee to the account.

DETAILED DESCRIPTION OF THE INVENTION

Various embodiments of the present invention provide for verifying a timestamp. As used throughout this document, the term "timestamp" shall be understood to correspond to any representation of a date, time, day-of-week, or any other measurement produced by a chronographic device. In many cases, such measurements are effectively synonymous; for example, many computer clocks record time as the number of seconds elapsed since Jan. 1, 1900, which is easily converted to date and day-of-week formats. The timestamp may include a cleartext portion, a ciphertext portion or both. A timestamp could be used to record the time at which a document was printed, a photocopy was made, or a facsimile was received.

In this disclosure, certain ancillary elements used in conjunction with the timestamping device are well understood to those skilled in the art and are not shown. For example, the design and construction of clocks, computer memories, and software or hardware cryptographic algorithms, are well known to those skilled in the art and will not be described in detail herein.

In accordance with various embodiments of the present invention, a recipient of the timestamp can determine timestamping device authenticity and time integrity by verifying the cryptographic operation used to generate the timestamp. For example, the recipient could provide the timestamp and a timestamp device identifier to a third party for verification. The third party could use the device identifier to determine the cryptographic operation used to generate the timestamp, and/or to determine the key used in the cryptographic operation. The third party could then perform an appropriate cryptographic operation to verify the authenticity of the timestamping device and the integrity of the timestamp presented. For example, the third party could decrypt a ciphertext portion of a timestamp having both a ciphertext portion and a cleartext portion, in order to confirm that the ciphertext portion represented the same time as the cleartext portion.

If the timestamp was encrypted with a device private key, the recipient could use the corresponding device public key to decrypt and verify the timestamp. The public key could either be obtained from a public database or distributed using digital certificates within the timestamp. Alternatively, instead of public/private key pairs, the timestamping device could use a symmetric key—either alone or in combination with public key cryptography. Or, in the case of a hashed time, the recipient can verify the timestamp by recomputing the hash of the cleartext time and comparing it with the received hash (the ciphertext portion of the timestamp). The hash could even be a keyed operation to provide greater security.

Timestamping Device and Timestamping Operations

Figure 1:
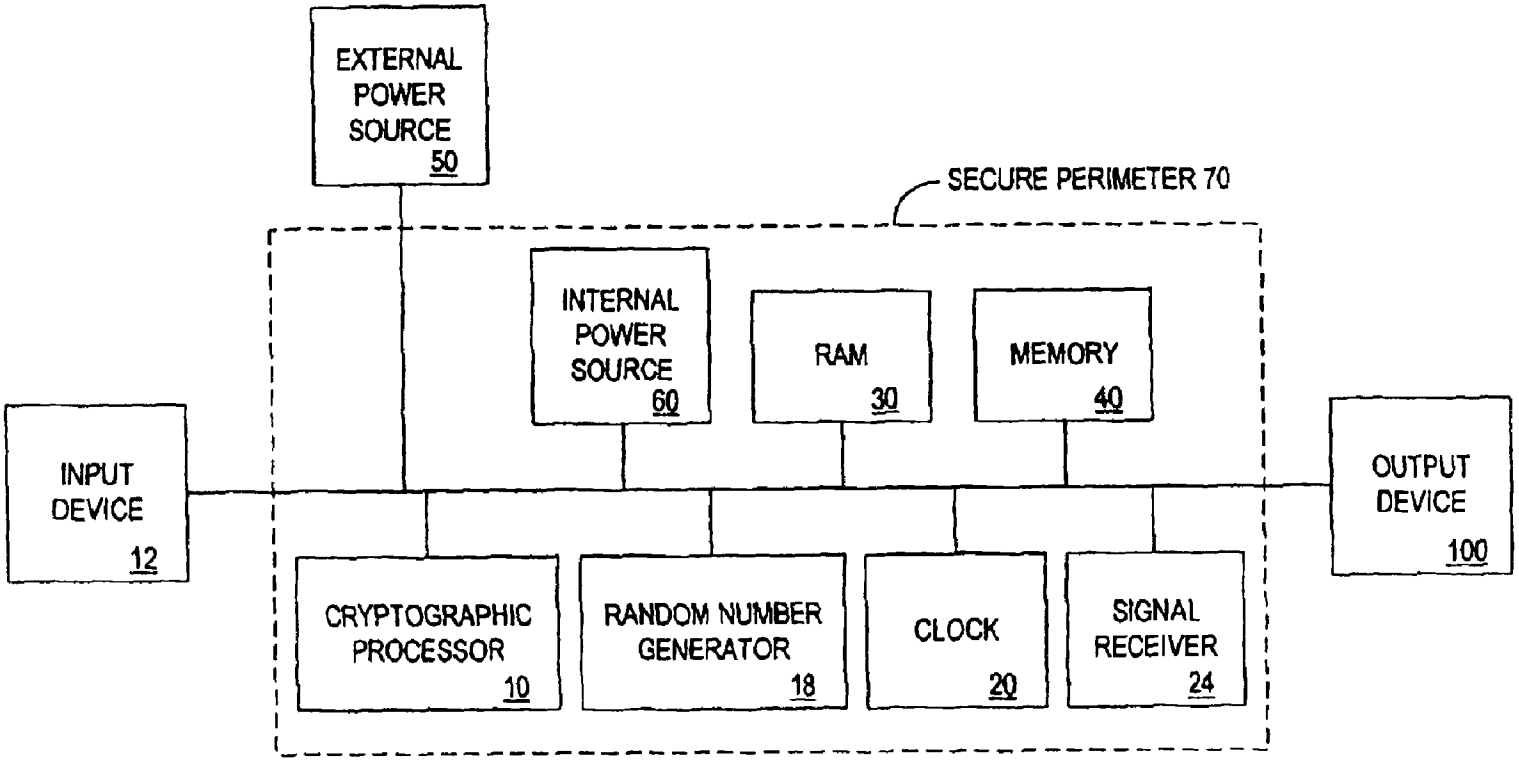
FIG. 1 illustrates the basic components of a device for secure timestamping.

Referring now to FIG. 1, there is shown one embodiment of a timestamping device including a cryptoprocessor 10, a clock 20, random access memory (RAM) 30, nonvolatile memory 40 and output device 100. The cryptoprocessor 10 can be a general purpose processor (e.g., an Intel CPU) receiving instructions from RAM 30 or memory 40, or it can be a special purpose processor optimized for performing cryptographic operations (e.g., a National Semiconductor iPower SPU). That is, the cryptoprocessor may comprise any hardware or software engine capable of performing cryptographic operations on a given quantity. As described in greater detail below, such operations may include both keyless and keyed operations, as well as various combinations thereof. The cryptoprocessor 10 and clock 20 are powered by external power source 50, with standby battery 60 to ensure operability during replacement or absence of external power source 50. Thus, external power source 50 could be an user-replaceable battery or an AC power source. Alternatively, the device could be powered by internal battery 60 alone (in which case the device stops functioning at battery death) or external power source 50 alone (necessitating resetting the clock from a trusted external time source—e.g., the GPS satellite signals discussed below—upon powerup).

The cryptoprocessor 10, clock 20, RAM 30, memory 40 and the control signals for output device 100 are contained within secure perimeter 70, making these components resistant to external tampering. Secure perimeter 70 may include physical, electronic, or a combination of physical and electronic features to resist tampering. For example, physical features could include encapsulation, electronic features could include a silicon firewall, and combination features could include self-zeroizing, or otherwise volatile, RAM 30 or memory 40 which electrically modifies its contents upon detection of tampering. Such tampering might include physically stressing the device, attempting to change the clock rate by replacing external power source 50 with a battery outside allowable current or voltage ranges, or attempting to change the clock rate by replacing external power source 50 with an AC power source outside an allowable frequency range. Alternatively, secure perimeter 70 could be merely tamper-evident. In that case, the process of timestamp verification should include checking the timestamping device for evidence of tampering. As will be appreciated by those skilled in the art, a great variety of tamper-resistant tamper-evident techniques can be deployed, and will not be enumerated in detail herein. Therefore, as a matter of convenience, terms such as "tamper resistant" or "secure" shall be understood to refer to any of the aforementioned or other security measures throughout this discussion.

In one embodiment of the invention, the timestamping device generates a time from clock 20 and outputs a timestamp (or message) consisting of the cleartext time plus a one-way function representative of the time. As used herein, a one-way function is one that outputs a unique representation of an input such that a given output is likely only to have come from its corresponding input, and such that the input cannot be readily deduced from the output. Thus, the term one-way function includes hashes, message authenticity codes (MACs—keyed one-way functions), cyclic redundancy checks (CRCs), and other techniques that are well known to those skilled in the art. See, for example, Bruce Schneier, "Applied Cryptography: Protocols, Algorithms, and Source Code in C," 2nd ed., John Wiley & Sons, Inc., 1996. As a matter of convenience, the term "hash" will be understood to represent any of the aforementioned or other one-way functions throughout this discussion. Typically, the hash would be performed by cryptoprocessor 10 using a hardwired hashing algorithm or one stored in RAM 30 or memory 40. The hash may either be a keyed or keyless operation.

Furthermore, a unique device identification number, stored in RAM 30 or memory 40, can be added to the hash to provide assurance of message authenticity. A recipient wishing to verify the time would read the time and device ID, then perform an identical hashing algorithm to recompute the hash. If the received and recomputed hashes agree, the recipient is assured that the timestamp came from the timestamping device and had not been altered subsequent to timestamping.

Where the timestamping device is used to timestamp a sequence of messages, a chain of hashes—where each timestamp also includes representations of one or more previous messages—provides an additional degree of message assurance. For example, RAM 30 or memory 40 could store a hash of the last three time stamps to be incorporated into the current timestamp, as shown in the following example. Imagine that timestamping is performed once monthly, with the latest four dates being: 11/19, 12/15, 1/13, and 2/24. The hash for the last timestamp could be Hash_2/24=Hash("2/24")+Hash_11/19+Hash_12/15+Hash_1/13, with the hashes for the November, December and January dates relating to their respective previous three months in a similar fashion. The chained hashes discourage fraudulent modification of a timestamp as described below.

Suppose a forger discovers the device private key and uses it to change both the cleartext and hashed portions of the 11/19 timestamp to read 11/9. A suspicious party could challenge the temporally altered 11/19 timestamp by using it to recompute the subsequent three timestamps, and comparing them with their known values. If the known and recomputed timestamps disagree, the 11/19 timestamp is demonstrated to have been altered. When tampering is generally suspected but no specific timestamp is in question, an altered timestamp can be discovered by recomputing the most recent timestamp and continuing backward until three successive unconfirmable timestamps are found, indicating that the next timestamp in sequence has been altered. Of course, the forger could theoretically change all the timestamps in the chained hash, but this would require more effort than changing just the desired one, and would increase the chances of detection.

Still greater assurance of integrity and authenticity can be obtained by encrypting part or all of the timestamp in cryptoprocessor 10 using a key stored in memory 40. For example, instead of hashing, the time might be encrypted with a device-specific private key if authenticity is required, and possibly also with a recipient-specific public key, if confidentiality is desired.

Certain well-known enhancements to public key cryptography can also be used to provide greater assurance. For example, the message could include digital certificates for public key distribution to a party that does not know the device public key needed to verify a timestamp encrypted with the device private key. In a digital certificate, the device public key is encrypted (and vouched for) by the private key of a trusted certifier (e.g., a well-known manufacturer of the timestamping device) whose public key is known to the recipient. The recipient uses the certifier's public key to decrypt the device public key, then uses the device public key to verify the timestamp. Alternatively, the recipient could simply obtain the device public key from a publicly accessible database, eliminating the need for digital certification.

To this point, asymmetric (public key) encryption has been discussed in the context of the various cryptographic operations. However, symmetric key (e.g., DES) key encryption is also possible, either as a replacement for, or adjunct to (e.g., a symmetric session key transmitted using public key cryptography) public key cryptography.

Another commonly used cryptographic technique, the so-called challenge-response protocol (CRP), may be used to ensure to a recipient that a timestamp is current, i.e., not a copy of a previously used timestamp. In the CRP, a timestamp requestor challenges the timestamping device by transmitting a datum to the timestamping device, and checking for the same datum in the received response. Thus, reused timestamps are prevented (or at least detectable) because a reused timestamp would contain a datum corresponding to a previous request/reply pair, rather than the current datum. Those skilled in the art will appreciate that the challenge can use any datum whose value cannot be predicted by the recipient; random numbers happen to be a particularly convenient choice. Alternatively, the timestamping device could include a random number generator 18 to generate random numbers internally. In this somewhat weaker version of the CRP, the recipient would not necessarily know that the timestamp was unique, but only that he had not been sent a copy of a timestamp he himself had previously received.

Although certain exemplary cryptographic operations (hashing, asymmetric encryption, symmetric encryption, digital certificates, and challenge-response protocols) have been disclosed for use singly or in specified combinations, those skilled in the art will appreciate that many other combinations of these basic operations may be used, depending on the needs of the specific application.

As discussed herein, the timestamp may be generated and/or outputted at a variety of frequencies and/or in response to a variety of requests, including: 1) at predetermined times, 2) upon request of either the user or the recipient, 3) upon presentation of a request encrypted in a public key corresponding to the private key of the timestamping device, 4) upon production of data by an output device (e.g., a document production device), or 5) under control of a broadcast signal.

The timestamp can be created and outputted upon receipt of a timestamping request at input device 12. Input device 12 might be a simple I/O port for receiving an external electronic signal, or could include a push-button or other mechanical device to generate the timestamp request. In the case of an electronic signal, the cryptoprocessor 10 might only accept a request encrypted with a public, private, or symmetric key, and the cryptoprocessor 10 would then verify the timestamp request prior to providing the requested timestamp. The external electronic signal could be generated by a remote location which broadcasts or otherwise transmits the timestamp request to the timestamping device.

Alternatively, the time request could be internally generated under control of the cryptoprocessor 10, according to a predetermined schedule, having either regular or irregular intervals, loaded in RAM 30 or memory 40. Timestamping in response to a predetermined schedule, rather than requester control, would be useful in applications such as remote monitoring or event logging. The schedule could either be factory loaded (and unalterable) or loadable through input device 12. In the latter case, a request to load the schedule would preferably be encrypted in the device public key, as described above with respect to requestor timestamping. As yet another alternative, timestamping could be dynamically controlled using an algorithm in which a future timestamp is set in response to one or more previous timestamps. For example, in certain monitoring applications, a normally infrequent timestamping schedule could be accelerated in response to detection of targeted events.

Figure 2A:
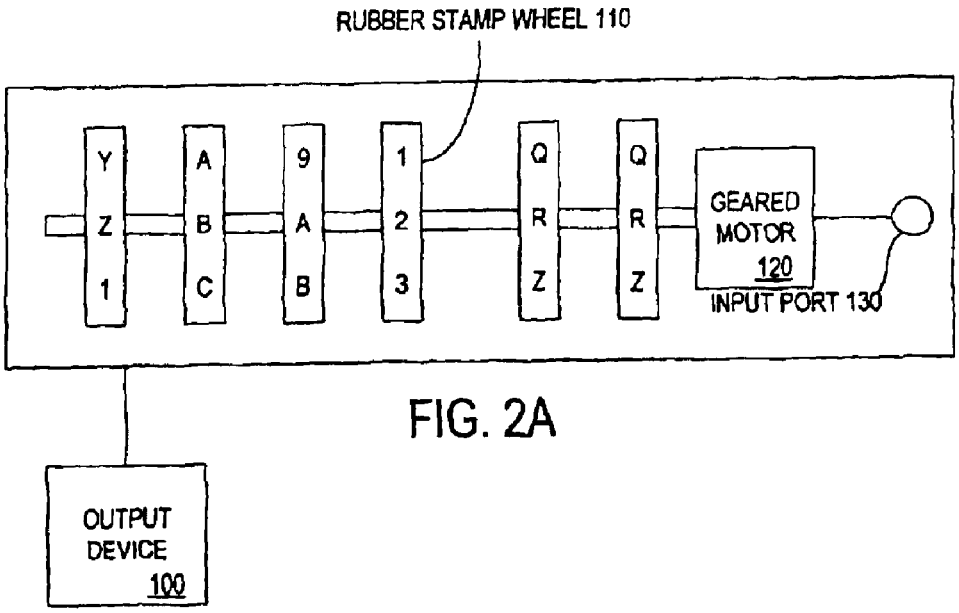
FIG. 2A illustrates a bottom view of a timestamp printer for use with paper documents.
Figure 2B:
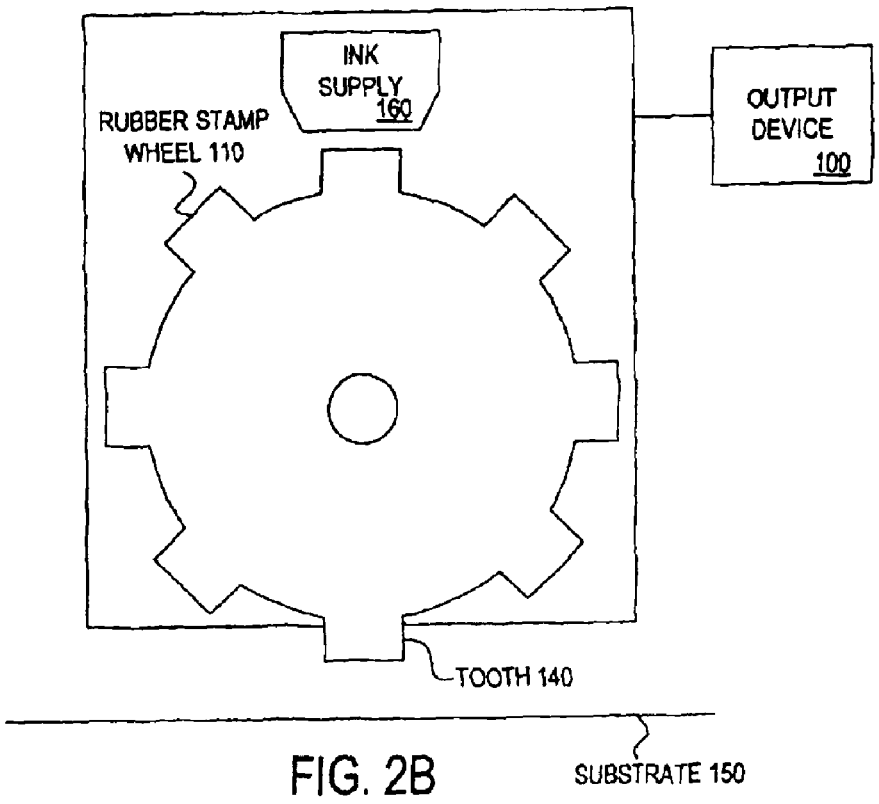
FIG. 2B illustrates an end view of a timestamp printer for use with paper documents.
Figure 3:
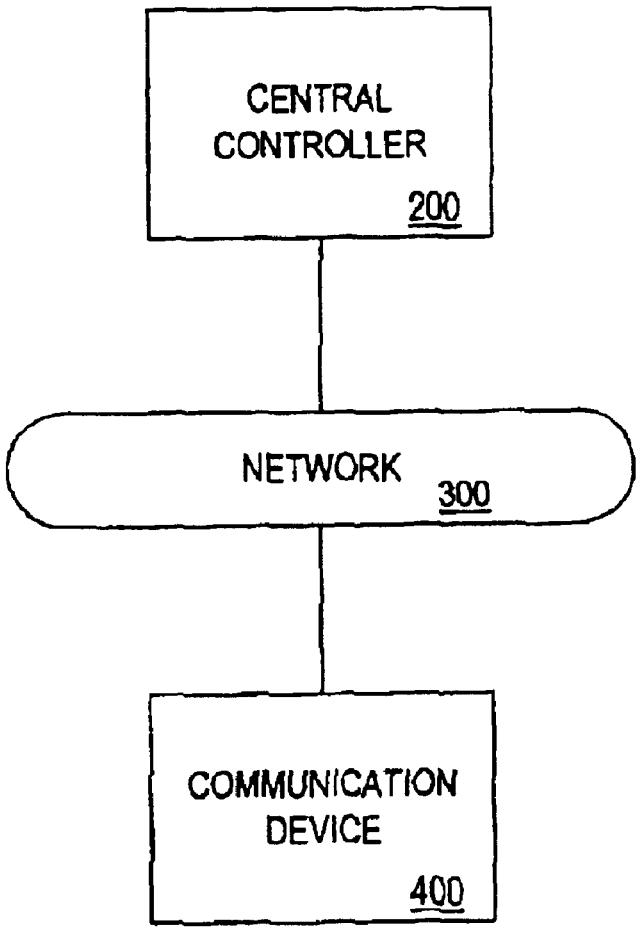
FIG. 3 illustrates a system for verifying a timestamp.

The timestamp is outputted through output device 100. For use in document timestamping, the output device 100 might be a printer for recording the timestamp onto a piece of paper. FIGS. 2A and 2B illustrate bottom and end views, respectively, of an exemplary printwheel device 100. Print-wheel device 100 rotates rubber-stamp wheels 110 using geared motors 120 under control of an electrical control signal at input port 130. The wheels 110 have teeth 140 around their circumference to print an alphanumeric code when a selected sequence of teeth 140 is in contact with substrate 150. The teeth 140 receive ink from an ink supply 160. As mentioned previously, the timestamp would typically include some cryptographic function of the time, such as a hash or encrypted code, which one could use to verify the integrity and/or authenticity of the time. If used as a stand-alone device, the timestamping command could be given via a push button or could be generated automatically by pushing down on a spring-loaded housing enclosing printwheel device 100, much like currently available handheld devices for document stamping. Access to the timestamping device could optionally be controlled by requiring an authorized password (e.g., via an alphanumeric keypad) before timestamping will occur.

Regardless of the configuration of the device, signal flows between the cryptoprocessor and the output device could be secured to provide additional assurance.

Timestamp operations may be limited and/or controlled based on specified criteria. For example, the timestamp device may be allowed to generate only a specified number of timestamps, or, alternatively, may be allowed to use a specified cryptographic key or algorithm only a specified number of times. Thus, one embodiment of the present invention comprises determining a maximum number of timestamps stored in RAM 30 or memory 40 and comparing the maximum number to a total number of timestamps produced stored in RAM 30 or memory 40. If the number of timestamps produced is greater than the maximum number of timestamps, cryptoprocessor 10 may be prohibited from producing another timestamp. The comparing process described above may be performed by the cryptoprocessor 10 itself or by an external source that then transmits a command signal to the cryptoprocessor 10, thereby prohibiting the production of further timestamps. The comparing process may be performed in response to a request for a timestamp or according to a predetermined schedule.

A user may be prompted to "recharge" the timestamping device by purchasing, for example, an additional number of timestamp generations, or additional use of the present cryptographic key. Alternatively, a new cryptographic key may be transmitted to the timestamping device and stored in RAM 30 or memory 40 in exchange for a fee.

The production of timestamps may be limited based on an amount of funds in an account associated with the timestamping device. For example, the account may be charged a fee each time a timestamp is generated by the timestamping device. According to one embodiment, a process for generating a timestamp may include a step of determining an amount of funds associated with the account and determining the fee charged for generating the timestamp. If the amount of funds in the account is less than the fee amount, the timestamp will not be generated. A user may then be informed that the timestamp request is denied, and may further be prompted to increase the amount of funds in the account.

Timestamp Verification

Generating and outputting a timestamp enables a party who did not necessarily witness the timestamping to verify the authenticity of the timestamp and/or the integrity of the time represented by the timestamp. In general, the recipient will verify the timestamp by performing some combination of hashing and decryption appropriate to the particular combination of cryptographic operations used to create the timestamp.

For example, in cases where the timestamp is generated by hashing, the recipient need only read the cleartext time and recompute a hash value of the cleartext time to verify the timestamp. If the received and recomputed hash values agree, the recipient may be confident that the timestamp has not been altered.

In cases where the timestamp is encrypted with a corresponding device private key, the recipient can then simply decrypt the timestamp and perform any other cryptographic operations needed to verify the timestamp. The recipient would look up the corresponding public key from a public database, read the timestamp from the document, decrypt the timestamp using the public key, and determine and verify the document creation time. Alternatively, as suggested earlier, digital certificates could be used to distribute the device public key to a timestamp recipient.

In certain situations, the above procedures may not be possible—for example: 1) when public key cryptography is not used, 2) when it is desired to keep the cryptographic algorithms confidential from the recipient, or 3) when the recipient lacks the capability to perform cryptographic verifications.

In such cases, a third-party certifier may provide the recipient with verification. For example, the verification can be provided by a central controller 200 accessible through a communications network 300 by a recipient using a communication device 400. The communication device 400 and the communications network may employ at least one of a variety of well-known communication means, including a telephone connection, an Internet connection, a wireless connection, or a website. Verification and/or access to the central controller 200 may be free or toll-based. According to one embodiment of the present invention, a caller would use the touch-tone keypad of a telephone to enter the date (or other representation of a time) and the timestamping device ID number after connecting to the central controller 200 via a 900 number. The caller could also provide the information verbally in response to prompts from an interactive response unit (IRU). Alternatively, a recipient with an Internet connection could enter any necessary information into a form displayed on a website, using a keyboard or other input device, such as a wireless handheld device. The central controller 200 would use the device ID number to look up the database record for that particular device in a database and retrieve its cryptographic key. The central controller 200 would then use the cryptographic key to perform the appropriate cryptographic operation (e.g., hashing, device-specific key encryption, etc.) necessary to verify the received timestamp. For example, the central controller 200 could recompute a hash value of the date and provide the hash value to the caller. The communication to the recipient could be via any well-known communication means, including the telephone connection, email, facsimile, or via a displayed webpage. The caller could then compare the recomputed hash value to his received hash value.

Alternatively, the caller could provide the received timestamp (either instead of or in addition to the date) and the device ID number to the central controller 200. The central controller 200 would then use the determined cryptographic key to perform an appropriate cryptographic operation on the timestamp. For example, the central controller 200 could decrypt the received timestamp and provide the decrypted date to the caller. The caller could then verify the timestamp by comparing the decrypted date to the cleartext portion of the received timestamp. If the caller also provided a received cleartext date to the central controller 200, the central controller 200 could compare the determined date to the received cleartext date and provide a confirmation to the caller.

The party desiring to verify the timestamp may be charged a fee by the central controller 200 in exchange for providing verification of the timestamp. Such a fee may be based on a predetermined flat fee, the connection (or duration of the connection) to the central controller 200, or a subscription. The central controller 200 could also (or alternatively) charge a fee to the party that generated the timestamp. For example, the device ID number might be used by the central controller 200 to identify an account associated with the party that generated the timestamp. A fee could then be charged to this account.

Alternative Time Sources

It was mentioned previously that the time is generated via an internal clock 20. In another embodiment of the invention, the timestamping device could obtain time from an external source via signal receiver 24 disposed inside the secure perimeter 70. The signal receiver 24 could receive time signals from ground stations (e.g., the US Naval Observatory atomic clock), from orbiting satellites, or from any other trusted external time source. External time signals are especially advantageous for deterring hacking of an internal clock.

In the satellite example, the timestamping device could receive timing signals from the American Global Positioning System (GPS), for which sensors (receivers) are widely available on the commercial market. Alternatively, the receiver could receive signals from the Russian Glonass system. Although GPS is primarily used for location finding, those skilled in the art will appreciate that the same timing signals can also be used as an accurate time source. Consequently, the signal receiver 24 may be as an alternative time generator to clock 20. These basic operating principles of satellite ranging systems are well known (e.g., Herring, "The Global Positioning System," Scientific American, February 1996, pp. 44-50; and "How Does GPS Work?," Jane's Intl. Defense Review, Dec. 31, 1994, p. 147) but will be briefly summarized below to illustrate the dual location- and time-determining capabilities of GPS.

Any signal sent from a satellite to a terrestrial receiver is delayed by an amount proportional to the distance from the satellite to the receiver. Therefore, the difference between a clock signal sent from a satellite and a receiver's local clock (typically a few hundredths of a second) will determine the distance from the satellite to the receiver. Knowing this distance establishes that the receiver is located somewhere on the surface of a sphere, of radius equal to the determined distance, centered about the satellite. However, the receiver's exact location—a particular point on the surface of that sphere—remains undetermined. By receiving signals from several orbiting satellites, the receiver's exact three-dimensional location on the surface of the earth can be determined as the point of intersection of all their locating spheres.

In practice, the receiver clock is cheaper, and therefore less accurate, than the satellite' highly accurate atomic clocks. This means that all of the locating spheres will be slightly smaller or larger than their true values, depending on whether the receiver clock runs slow or fast, respectively. Consequently, the location spheres may not intersect at a single point. This difficulty is overcome by adjusting the receiver clock by an arbitrary amount, which in turn changes each of the location radii by the same amount, and to check for a single point of intersection of the locating spheres. If not, the receiver clock is readjusted, in an iterative process, until a single point of intersection is found. That is, the inaccurate receiver clock provides a good initial guess regarding the point of intersection, and the fact that the locating spheres must intersect at a single point corresponding to the receive's terrestrial location is used to improve the initial guess. Taken to its extreme, such iteration could be performed without requiring a receiver clock at all—this would simply require more iterations than if the receiver clock had been available to provide an initial guess.

The end result of the iteration process is a determination of both the exact location of the receiver and the correct time. This time can then be used as part of the timestamping process. Of course, if high time accuracy is not required (the received GPS time is only off by a few hundredths of a second), the timestamping device could simply accept the received satellite clock signal (or an average of several such signals) as an approximation to the correct time without performing the iterative process described above.

Finally, as is currently done for certain military applications, the received time signals could be encrypted in the time transmitter's private key, or in the receiver's public key, as an extra measure of assurance that an impostor has not substituted an incorrect time for that of the broadcast source. In the latter example, the broadcasted time signal may be thought of as narrowcasted because only a specific recipient can decrypt the time. In such applications, the cryptoprocessor 10, RAM 30 and memory 40 may be used to perform the necessary decrypting (or other decoding). It will be advantageous to dispose the receiver within the secure perimeter to prevent insertion of fraudulent signals. Alternatively, an encrypted time could be certified without prior decryption, with this step to be performed by the recipient during subsequent verification.

As the foregoing illustrates, the signal receiver 24 could either supplement or replace the clock 20. In certain embodiments, the clock 20 could be used to double-check the received time (or vice-versa) by comparing the received time against the internal clock time—which could have been set at the factory or by a previous radio broadcast. The received time would be deemed accurate provided the two times agreed to within the cumulative inaccuracies of the received signal (external time source inaccuracy plus any uncorrected transmission delay) and the internal clock 20. Such double-checking might be especially useful where the GPS signals are broadcast in slightly degraded form (e.g., the Standard Positioning mode used in many commercial applications).

Authenticated Location

In certain cases, it will be desired to certify both the time and geographical location at which the document was timestamped. For example, it might be desired to certify the time zone in which the document was timestamped. As discussed above with respect to external time, the GPS signal receiver 24 is also ideally suited to provide the necessary location signals. Such signals would be incorporated into the timestamp, either as cleartext and/or cryptographic form.

Alternative Output Devices

More sophisticated printers can also be used in addition to the simple printwheel mechanism described above. For example, the printer could include traditional dot-based (e.g., laser, bubble, inkjet, or line printers) or character-based computer printers (e.g., daisywheel), as well as dot-based document printers (e.g., facsimile machines, photocopiers, or even barcode printers), or any other document production device. Each of these devices could send a timestamping request through input 12, either automatically upon document printing or manually upon operator request (e.g., a "certify" button to be used manually upon printing a page). Furthermore, manual or automatic operation could be selectable via an on-off timestamp toggle.

Many other output devices are possible, especially when the timestamp is not required to be directly printed on a paper substrate. For example, the output device could print a special, difficult-to-forge label to be applied to the surface of a paper document or other substrate. Furthermore, the timestamp has been described previously as a human-readable alphanumeric code, but this is not necessary. Any machine-readable, optically-detectable code would serve equally well, and might be preferred to deter casual snooping. For example, the timestamp could be a fine mesh of dots in a geometric pattern covering the entire document. The dots would be small enough to allow easy viewing of the document while at the same time making it much more difficult to change any of the words in the document since the dots would be laid over the text. The dots could be laid down using any arbitrary machine-readable coding scheme. For example, the distance between individual dots could represent the digits of the coded portion of the timestamp. Such an embodiment is most practically performed by a timestamping device connected to a printer or fax machine which is easily capable of setting down such a fine mesh of dots.

Machine-readable, optically-detectable codes are also appropriate when the output device is a recorder used for writing the timestamp to a non-paper medium. Certain of these media, such as optical data recording devices, have an added advantage of being write-only, which can provide extra assurance against timestamp modification. For example, a laser could write to optical media (e.g., CD-ROM or magneto-optical disk). Like paper, such write-only media are often permanent or semi-permanent in nature.

Finally, the timestamp need not be written to a permanent or semi-permanent media, but could be displayed for transient viewing on an electronic or other display in human- or machine-readable form.

Finally, the output device need not be physically located with the rest of the timestamping device. For example, a centrally located timestamping device could have one or more remotely located output devices accessible via broadcast signals or data or voice networks. Such configuration would be especially useful for remote time notarization applications.

Note that, just as with conventional timestamping devices, the timestamp, according to some embodiments, may not attest to the authenticity of the timestamped document, but only to when the timestamp was appended. For example, a fraudulent user could still copy a legitimate timestamp from a first document to a second document and present the falsely timestamped second document to an unsuspecting recipient.

Nevertheless, by providing added assurance as to the timestamp, the timestamping device disclosed herein represents a distinct improvement over conventional timestamping devices which provide assurance of neither the timestamp nor the document. Timestamp copying can be further discouraged by the use of special measures such as write-once media (as discussed above) for timestamping electronic documents or uncopyable inks for timestamping paper documents. Examples of uncopyable (but ultimately optically detectable) inks include: 1) specially colored inks that cannot be detected by photocopy machines, 2) so-called "invisible" inks that appear upon application of a chemical or ultraviolet developer, and 3) delayed-visibility inks that are initially invisible but develop slowly over time in response to aging or light exposure. The term "uncopyable inks" could also include timestamps that can be copied with less than full fidelity, e.g., inks that fade, change color, or change contrast upon copying. Finally, the timestamping device could print "uncopyable patterns" that exhibit interference patterns or other optical distortions upon copying. Such uncopyable inks or uncopyable patterns would be especially useful where timestamped documents are to be transmitted via an unsecured courier. Those skilled in the art will appreciate that these and other types of anti-counterfeiting measures can increase the difficulty of successfully copying an original timestamp onto another document.

Yet another type of fraud involves modifying the document data rather than the timestamp—for example, timestamping a document and later altering the document content, or pre-timestamping blank pages to be printed at a later time. Such fraud can be discouraged by the use of inks or patterns whose physical characteristics (e.g., reflectivity, refractivity, contrast, color or hue) depend on whether the timestamp is applied on top of printing, or printing is done on top of a timestamp. Preferably, the timestamp will normally be applied over portions of the printed document to be protected, and any attempt to overprint the timestamp with other printing will be optically detectable. The timestamp could even be restricted to only the printed portion of a page, to discourage the addition of new text atop a previously timestamped but otherwise blank portion of the page. Restricting the timestamp to only the printed portion of the page could easily be implemented in connection with a facsimile printer, computer printer, or any other device capable of outputting a timestamp of arbitrary size. If the timestamping device produces a timestamp of fixed size, and a single timestamp is smaller than the portion of the printed document that is to be protected, multiple applications of the timestamp may be used. Alternatively, the printwheel device of FIG. 2 could be adapted to operate in a continuous fashion (e.g., a roller) for timestamping atop text of arbitrary size. Any of the aforementioned fraud detection techniques shall be referred to as "overprint detection."

Augmented Timestamps

The aforementioned techniques—uncopyable inks, uncopyable patterns and overprint detection—are examples of physical techniques that may be used to deter fraud. Besides physical techniques, informational techniques may also be used to deter fraud. Informational techniques involve incorporating information about the document, in the form of 1) content identifiers, 2) witness identifiers, or 3) time bracketing into the timestamp.

In a simple form of content identifier, a timestamping device operator could count the number of words on the document to be timestamped and then enter this number into the timestamping device. Data input could be conducted through a numeric keypad attached to the device. When the timestamp was then generated by the cryptographic processor, the coded portion of the timestamp would include an encrypted version of the number of words in addition to the date. Other data elements that could be incorporated into the timestamp include the number of lines of text, the number of instances of a particular word, the largest dollar amount, the number of pages in the document, etc. Such information incorporated into the timestamp makes it increasingly difficult for anyone to undetectably modify the original document. The memory of each timestamping device could contain a database of 100 data element categories as described above. A printed copy would be available to the timestamping device user. The user would simply decide which data element to incorporate, enter the index number of the data element database, and then enter the numeric value of the data element. Upon authentication of the timestamp, the data element would be revealed.

The content identifier could also include information about the document in the form of various timestamp color schemes. A blue timestamp, for instance, could indicate a financial document while red was reserved for legal documents. The timestamping device operator would enter a code such as 01 for finance, 02 for legal, 03 for contracts, etc. The timestamping device would incorporate this information into the color of the timestamp, perhaps using separate colors for the clear text and coded text portions of the timestamp. As shown by the foregoing examples, those skilled in the art will appreciate that any identifiable datum reflective of document content can be used as the content identifier.

In addition to providing a degree of document integrity, timestamps could include information about those individuals present at the time the timestamp was affixed to the document. In a simple form of witness identifier, each witness to the event enters a unique private identifier (such as his private key or personal ID number) into the timestamping device before the timestamp is affixed to the document. The private identifier is then incorporated into the coded portion of the timestamp. The private identifier could be entered manually via a keypad, or automatically via touch memory buttons (described in more detail below), PCMCIA cards, or other portable personal access tokens.

If greater levels of security are required, a challenge-response protocol can be used to verify that none of the event witnesses has stolen another person's private identifier. After entering his private identifier, a witness would be challenged by the timestamping device to enter an additional piece of information, such as his mother's maiden name. The response would be compared against its expected value stored in a database in the memory of the timestamping device when the private identifier was first registered with the device. Incorrect responses would invalidate the previously entered private identifier.

In the above embodiments, users must be careful when entering private identifiers to ensure that they are not stolen by other users of the timestamping device. To make this process more secure, tokens such as the Touch Memory device manufactured by Dallas Semiconductor can be used. Each timestamping device user would have his private identifier stored in a Touch Memory button which consists of a computer chip housed within a small button shaped stainless steel case. The case may be ring-shaped and worn around a user's finger. The chip contains up to 64 kb of RAM or EPROM, sufficient to store a plurality of cryptographic keys. The device transmits data bi-directionally at 16.3 kb per second when placed into contact with a reader device, which would reside within the timestamping device. The user touches the button device to the reader each time that he wants his private identifier incorporated into the timestamp. Each chip contains a unique serial number that is laser-etched into the chip at the time of manufacture. The DS1427 configuration includes a tamper-resistant real-time clock that may be utilized as a supplementary audit trail, so that authenticatable information could be stored in the user's Touch Memory button in addition to being incorporated into the coded portion of the timestamp.

Still greater levels of security can be obtained if biometric readers are built into the timestamping device for incorporating biometric data (e.g., fingerprint, retinal pattern or any other unique physiological parameter) into the coded portion of the timestamp. Biometric readers could also be used to authenticate the private identifiers that are entered by all witnesses.

Yet another informational technique could be used to temporarily bracket access by the timestamp operator. In this technique, a timestamp would indicate an open date and a close date, creating a virtual open parenthesis or closed parenthesis within the coded portion of the timestamp. For example, a professional working on a document might need to show the starting and ending times in order to determine billable hours. The timestamping device could have separate buttons labeled start and stop. The start button would be pressed before stamping a document, with such indication being incorporated into the coded portion of the timestamp. The document would then be changed, and the close timestamp would be placed over the open timestamp.

As described above, the device ID may be incorporated into the timestamp. According to some embodiments, the device ID may serve as an account identifier, and, as described above, may be used by a verification service to bill an account. Those skilled in the art will recognize that many various types of identifiers may be used to identify an account associated with the timestamp. For example, a witness identifier or financial account identifier (such as a bank account number or credit card number) may be incorporated into a timestamp and used by a verification service to identify an account to be charged when a recipient of a timestamp requests verification of the timestamp.

Alternate Timestamping Commands

It was mentioned previously that output device 100 could generate the timestamp upon external command. Although such an external command will often be a request from a timestamp recipient, it could also be generated automatically upon detection of an event (or measurement) external to the timestamping device by an appropriate sensor acting as input device 12. Such an event could be any normal or abnormal occurrence whose time of occurrence is to be recorded.

For example, in automobile applications, normal events might include entering an automated toll road or a police car passing a prescribed checkpoint, while abnormal events might include a rental car leaving an authorized operating area or air bag inflation during an accident. In any of the aforementioned examples, a sensor would detect the triggering event and automatically order the timestamp generation. The sensor could take many different forms, ranging from a simple photodiode (e.g., detecting a laser beam marking a boundary) to a GPS receiver (e.g., used as a location finder subject to predetermined alarm limits). In addition, the sensor could be located either within the timestamping device (e.g., analogous to a "flight recorder"), or externally (e.g., a central monitoring station). Where the sensor is external, it would transmit a timestamp request to a receiver, disposed within the timestamping device, acting as input device 12. In a variation of the above-mentioned location finder, the GPS receiver could be linked to a transmitter for broadcasting the car's location upon receipt of an authorized command at a sensor. Considered together, the GPS receiver, transmitter, and airbag sensor could be regarded as a transponder. The actual transmitters, receivers, and sensors needed for such location transmitters will not be discussed in detail, as those skilled in the art will appreciate that all the necessary components are widely commercially available. For example, the Lojak car anti-theft system uses such components—but without cryptographically assured timestamping—to transmit a stolen car's location upon command of a radio signal. Finally, the timestamping device could be augmented with electromechanical circuitry to take additional action automatically upon detecting the triggering event. For example, a common application might be an automatic cut-off (a kind of "dead man's switch") to disable an engine in the event of emergency or straying outside a prescribed region.

Although the above examples have been given primarily in the document production and automotive contexts, those skilled in the art will appreciate that the same technology can be used in any other monitoring applications where the time of occurrence of an event is to be recorded.

For purposes of illustration only, and not to limit generality, the present invention has been explained with reference to various examples of time sources, cryptographic operations, output devices, and sensors. However, one skilled in the art will appreciate that the invention is not limited to the particular illustrated embodiments or applications, but includes many others that operate in accordance with the principles disclosed herein.

What is claimed is:

[1. A method comprising:

receiving a timestamp from a caller via a telephone connection;

receiving a device identifier from the caller, in which the device identifier identifies a device;

determining a cryptographic key based on the device identifier;

determining a representation of a time based on the timestamp and the cryptographic key;

providing the representation of the time to the caller;

determining an account; and charging a fee to the account.]

[2. The method of claim 1, in which the timestamp is optically detectable on a physical document.]

[3. The method of claim 1, in which receiving the timestamp comprises:

receiving the timestamp at a central controller.]

[4. The method of claim 1, further comprising:

receiving a telephone call from the caller.]

[5. The method of claim 1, in which receiving the timestamp comprises:

receiving a sequence of DTMF signals; and determining the timestamp based on the DTMF signals.]

[6. The method of claim 5, in which the sequence is entered by the caller at a keypad.]

[7. The method of claim 1, in which receiving the timestamp comprises:

receiving a sequence of signals via an interactive response unit (IRU).]

[8. The method of claim 1, in which receiving the timestamp comprises:

receiving the timestamp via a toll-based telephone line.]

[9. The method of claim 8, in which the toll-based telephone line is associated with a 900 number.]

[10. The method of claim 1, in which the timestamp comprises a sequence of alphanumeric characters.]

[11. The method of claim 1, in which determining the account comprises:

receiving an account identifier that identifies the account.]

[12. The method of claim 1, in which the timestamp comprises an account identifier that identifies the account.]

[13. The method of claim 1, in which the account is associated with the caller.]

[14. The method of claim 1, in which the account is associated with a third party.]

[15. The method of claim 1, in which determining the account comprises:

determining the account based on the device identifier.]

[16. The method of claim 1, in which the account is a prepaid account.]

[17. The method of claim 1, in which charging the fee comprises:

debiting the account based on the fee.]

[18. The method of claim 1, in which determining the representation of the time comprises:

performing a cryptographic operation on the timestamp.]

[19. The method of claim 1, in which determining the representation of the time comprises:

decrypting the timestamp based on the cryptographic key.]

[20. The method of claim 1, in which providing the representation of the time comprises:

transmitting the representation of the time to the caller.]

[21. The method of claim 1, in which providing the representation of the time comprises:

displaying the representation of the time to the caller.]

[22. The method of claim 1, in which determining the cryptographic key comprises:

selecting a database record based on the device identifier, in which the database record comprises the device identifier.]

[23. A method comprising:

receiving a sequence of DTMF signals from a caller via a telephone connection;

determining a timestamp based on the DTMF signals;

receiving a device identifier from the caller, in which the device identifier identifies a device;

determining a cryptographic key based on the device identifier;

determining a representation of a time based on the timestamp and the cryptographic key;

providing the representation of the time to the caller;

determining an account; and charging a fee to the account.]

[24. A method comprising:

receiving a timestamp from a timestamp recipient via an Internet connection;

receiving a device identifier via the Internet connection, in which the device identifier identifies a device;

determining a cryptographic key based on the device identifier;

determining a representation of a time based on the timestamp and the cryptographic key;

providing the representation of the time to the timestamp recipient via the Internet connection;

determining an account; and charging a fee to the account.]

*25. A method, comprising:*

*receiving, by a central controller, a timestamp from a timestamp recipient;*

*receiving, by the central controller, a device identifier that identifies a timestamp device;*

*utilizing, by the central controller, the device identifier to determine a cryptographic operation used to generate the timestamp;*

*attempting, by the central controller, to verify the timestamp by using the cryptographic operation on at least a portion of the timestamp;*

*communicating, by the central controller, the results of the attempt to verify to the timestamp recipient; and*

*charging a fee.*

*26. The method of claim 25, in which communicating the results of the attempt to verify comprises providing information concerning at least one of the integrity of the timestamp and the authenticity of the timestamp device.*

*27. The method of claim 25, in which charging a fee comprises determining an account and charging the fee to the account.*

*28. The method of claim 27, wherein the account comprises at least one of an account of the timestamp recipient, an account associated with a third party, and an account associated with the device identifier.*

*29. The method of claim 25, wherein the timestamp comprises a cleartext portion and a ciphertext portion.*

*30. The method of claim 29, wherein the ciphertext portion comprises a one-way function corresponding to at least one of a hash, a message authentication code, and a cyclic redundancy check.*

*31. The method of claim 25, wherein the timestamp is encrypted with a device private key.*

*32. The method of claim 31, in which attempting to verify further comprises decrypting the timestamp with a corresponding device public key.*

*33. The method of claim 32, wherein the device public key is provided by at least one of a public database and by use of a digital certificate within the timestamp.*

*34. The method of claim 25, wherein the timestamp is encrypted with a symmetric key.*

*35. A computer readable memory storing instructions configured to direct a processor to:*

*receive a timestamp from a timestamp recipient;*

*receive a device identifier that identifies a timestamp device;*

*utilize the device identifier to determine a cryptographic operation used to generate the timestamp;*

*attempt to verify the timestamp by using the cryptographic operation on at least a portion of the timestamp;*

*communicate the results of the attempt to verify to the timestamp recipient; and*

*charge a fee.*

*36. The computer readable memory of claim 35, wherein the instructions to communicate the results of the attempt to verify direct the processor to provide information concerning at least one of the integrity of the timestamp and the authenticity of the timestamp device.*

*37. The computer readable memory of claim 36, wherein the instructions to charge a fee direct the processor to determine an account and charge the fee to the account.*

*38. An apparatus, comprising:*

*a computer processor configured to receive a timestamp from a timestamp recipient and to receive a device identifier that identifies a timestamp device;*

*a memory in communication with the computer processor and storing a program for directing the computer processor to utilize the device identifier to determine a cryptographic operation used to generate the timestamp, and to attempt to verify the timestamp by using the cryptographic operation on at least a portion of the timestamp; and*

*an output device, controlled by the computer processor, for communicating the results of the attempt to verify to the timestamp recipient, and for outputting a charge for a fee.*

*39. A method, comprising:*

*receiving, by a central controller, a timestamp from a timestamp recipient that includes a cleartext portion and a ciphertext portion;*

*receiving, by the central controller, a device identifier that identifies a timestamp device;*

*utilizing, by the central controller, the device identifier to determine a cryptographic key;*

*attempting, by the central controller, to verify the timestamp by using a cryptographic operation on the timestamp, wherein the cryptographic operation is associated with the cryptographic key;*

*communicating, by the central controller, the results of the attempt to verify to the timestamp recipient; and*

*charging a fee.*

*40. The method of claim 39, wherein the ciphertext portion comprises a one-way function corresponding to at least one of a hash, a message authentication code, and a cyclic redundancy check.*

*41. The method of claim 39, wherein the attempt to verify comprises:*

*utilizing the cryptographic operation to decrypt the ciphertext portion of the timestamp;*

*comparing the decrypted ciphertext portion to the cleartext portion; and*

*verifying the timestamp if the decrypted ciphertext portion matches the cleartext portion.*

*42. The method of claim 41, wherein the timestamp is encrypted with a device private key, and the cryptographic operation comprises using a corresponding device public key.*

*43. The method of claim 42, wherein the device public key is provided by at least one of a public database and by use of a digital certificate within the timestamp.*

*44. The method of claim 39, wherein the ciphertext portion is a hash of a time representation produced by a chronographic device.*

*45. The method of claim 44, wherein the attempt to verify comprises:*

*utilizing the cryptographic operation to compute a hash of the cleartext portion;*

*comparing the computed hash of the cleartext portion to the ciphertext portion; and*

*verifying the timestamp if the computed hash of the cleartext portion matches the ciphertext portion.*

*46. A computer readable memory storing instructions configured to direct a processor to:*

*receive a timestamp from a timestamp recipient that includes a cleartext portion and a ciphertext portion;*

*receive a device identifier that identifies a timestamp device;*

*utilize the device identifier to determine a cryptographic key;*

*attempt to verify the timestamp by using a cryptographic operation on the timestamp, wherein the cryptographic operation is associated with the cryptographic key;*

*communicate the results of the attempt to verify to the timestamp recipient; and*

*charge a fee.*

*47. The computer readable memory of claim 46, wherein the instructions to attempt to verify the timestamp direct the processor to:*

*utilize the cryptographic operation to decrypt the ciphertext portion of the timestamp;*

*compare the decrypted ciphertext portion to the cleartext portion; and*

*verify the timestamp if the decrypted ciphertext portion matches the cleartext portion.*

*48. The computer readable memory of claim 46, wherein the instructions to attempt to verify the timestamp direct the processor to:*

*utilize the cryptographic operation to compute a hash of the cleartext portion;*

*compare the computed hash of the cleartext portion to the ciphertext portion; and*

*verify the timestamp if the computed hash of the cleartext portion matches the ciphertext portion.*

*49. An apparatus, comprising:*

*a computer processor configured to receive a timestamp from a timestamp recipient that includes a cleartext portion and a ciphertext portion and to receive a device identifier that identifies a timestamp device;*

*a memory in communication with the computer processor and storing a program for directing the computer processor to utilize the device identifier to determine a cryptographic key, and to attempt to verify the timestamp by using a cryptographic operation on the timestamp, wherein the cryptographic operation is associated with the cryptographic key; and*

*an output device, controlled by the computer processor, for communicating the results of the attempt to verify to the timestamp recipient, and for outputting a charge for a fee.*

* * * * *